(12) United States Patent
Lv et al.

(10) Patent No.: US 10,633,784 B2
(45) Date of Patent: Apr. 28, 2020

(54) HEAT PUMP DRYER WITH DUAL-EXHAUST COMPRESSOR SYSTEM AND CONTROL METHOD THEREOF

(71) Applicant: QINGDAO JIAONAN HAIER WASHING MACHINE CO., LTD., Laoshan, Qingdao, Shandong (CN)

(72) Inventors: Peishi Lv, Shandong (CN); Sheng Xu, Shandong (CN); Huacheng Song, Shandong (CN); Shiqiang Shan, Shandong (CN)

(73) Assignee: QINGDAO JIAONAN HAIER WASHING MACHINE CO., LTD., Qingdao, Shandong (CN)

( * ) Notice: Subject to any disclaimer, the term of this patent is extended or adjusted under 35 U.S.C. 154(b) by 740 days.

(21) Appl. No.: 15/313,807

(22) PCT Filed: Jun. 30, 2014

(86) PCT No.: PCT/CN2014/081088
§ 371 (c)(1),
(2) Date: Nov. 23, 2016

(87) PCT Pub. No.: WO2015/180228
PCT Pub. Date: Dec. 3, 2015

(65) Prior Publication Data
US 2017/0198428 A1    Jul. 13, 2017

(30) Foreign Application Priority Data
May 29, 2014   (CN) .......................... 2014 1 0239898

(51) Int. Cl.
*F26B 7/00*    (2006.01)
*D06F 58/20*   (2006.01)
(Continued)

(52) U.S. Cl.
CPC .......... *D06F 58/206* (2013.01); *F04C 18/356* (2013.01); *F04C 23/001* (2013.01);
(Continued)

(58) Field of Classification Search
None
See application file for complete search history.

(56) References Cited

U.S. PATENT DOCUMENTS

2007/0169367 A1* 7/2007 Tadano ................. D06F 58/206
                                                    34/77
2011/0179822 A1* 7/2011 Sotojima ............... F04C 18/322
                                                    62/510

FOREIGN PATENT DOCUMENTS

CN    101004319 A    7/2007
CN    202430535 U    9/2012
(Continued)

OTHER PUBLICATIONS

International Search Report (PCT/ISA/210) dated Feb. 26, 2015 by the Chinese Patent Office as the International Searching Authority for International Application No. PCT/CN2014/081088.
(Continued)

*Primary Examiner* — Jason Lau
(74) *Attorney, Agent, or Firm* — Buchanan Ingersoll & Rooney PC

(57) ABSTRACT

A heat pump clothes dryer comprising a circulating air path consisting of a drying drum and a drying air path for circularly flowing drying air; and a heat pump system consisting of an evaporator, a throttling device, a condenser and a compressor successively connected end to end for circularly flowing a refrigerant medium. The condenser and the evaporator are disposed on the drying air path, and perform heat exchange with the drying air. The compressor has independent suction compression chambers, each suction compression chamber being switchably connected in
(Continued)

series or in parallel. When the dryer starts drying in a low-temperature environment, the suction compression chambers of the compressor operate in a parallel state, so that the air displacement of the compressor is increased to improve the flowing activity of the refrigerant medium in the heat pump system, so as to avoid occurrence of frosting of the evaporator.

13 Claims, 5 Drawing Sheets

(51) Int. Cl.
*F04C 18/356* (2006.01)
*F04C 23/00* (2006.01)
*F04C 28/02* (2006.01)
*D06F 58/28* (2006.01)

(52) U.S. Cl.
CPC ........ *F04C 28/02* (2013.01); *D06F 2058/287* (2013.01); *D06F 2058/2874* (2013.01)

(56) References Cited

FOREIGN PATENT DOCUMENTS

| CN | 103727034 | A  | 4/2014  |
|----|-----------|----|---------|
| EP | 1081383   | A2 | 3/2001  |
| EP | 2407669   | A2 | 1/2012  |
| EP | 2 551 401 | A1 | 1/2013  |
| EP | 2 551 402 | A1 | 1/2013  |
| JP | H01247786 | A  | 10/1989 |
| JP | 2007190257| A  | 8/2007  |
| JP | 2010156488| A  | 7/2010  |
| WO | WO 94/05846 | A1 | 3/1994 |
| WO | 2008101387| A1 | 8/2008  |
| WO | 2009098158| A1 | 8/2009  |
| WO | 2014076035| A1 | 5/2014  |
| WO | 2014076149| A1 | 5/2014  |

OTHER PUBLICATIONS

Extended European Search Report dated Nov. 3, 2017, issued by the European Patent Office in corresponding European Application No. 14893383.1 (8 pages).
Office Action (Notification of Reasons for Refusal) dated Mar. 13, 2018 in corresponding Japanese Patent Application No. 2016-562211 with English Translation, 9 pages.
Office Action dated May 31, 2018 in corresponding Chinese Patent Application No. 2014-10239898.8 with English Translation, 16 pages.
Examination Report dated Aug. 13, 2019 in corresponding Indian Patent Application No. 201627040519 with English Translation, 5 pages.

* cited by examiner

HEAT PUMP DRYER WITH DUAL-EXHAUST COMPRESSOR SYSTEM AND CONTROL METHOD THEREOF

FIELD OF THE INVENTION

The present disclosure relates to the field of household electrical appliances, and more particularly, to a heat pump dryer with a dual exhaust compressor system and a control method thereof.

BACKGROUND OF THE INVENTION

The use of the existing heat pump drying method drum type washing and drying machine or dryer. In a low-temperature environment, such as 0° C., from drying machine drying start stage, the temperature of the air blown out from the outer cylinder is close to 0° C. because the water temperature of the rinsing clothes is only slightly higher than 0° C. In this case, the saturation temperature of the refrigerant medium in the heat pump system under saturated pressure is much lower than 0° C., which results in the compressor of the heat pump system operating at low load and low input power, and the temperature rise in the outer cylinder is extremely slow, making the laundry drying efficiency is low. If the evaporation temperature of the refrigerant medium in the heat pump system in the evaporator maintains in a low temperature environment of below 0° C. for a long period of time, it will lead to the evaporator and the humid air blowing out of the outer cylinder in contact and a lot of frosting occur on the surface of the evaporator fin and decreasing the effective area of the evaporator and will block the cycle of the air circulation cycle, so that refrigerant medium of the compression system in the evaporator cannot be completely vaporized. The refrigerant medium in the liquid state enters the compressor along the suction pipe of the compressor, resulting in a failure of the compressor.

To solve the foregoing problem, some improvements schemes are put forward, for example:

A heat pump system with an auxiliary heat source which disclosed in the Chinese Patent Application No. CN201120558843 comprises a refrigeration compressor, an evaporator, a condenser, a throttling device, and an auxiliary heating device, and an auxiliary heating device is arranged on the auxiliary heating device on the air duct at the back end of the condenser outlet. When the ambient temperature is low, heat pump efficiency is low, the heating temperature will be relatively low, this time, the auxiliary heating device can be turned on to shorten the drying time. Thus, the auxiliary heating means is added behind the condenser, and the air heated by the condenser is reheated by the heating means to raise the temperature of the air flow in the drying air path so that the evaporator attains a higher ambient temperature to raise the activity of refrigerant medium in the heat pump system, to improve the efficiency of drying purposes. However, in this way, the need to increase in the drying duct heating devices and some structural parts, to a certain extent, increased a wind resistance in the air drying wind path, easy to affect the drying effect at room temperature.

In view of the foregoing, the present invention is proposed.

SUMMARY OF THE INVENTION

The object of the disclosure is to provide a heat pump dryer with a dual-exhaust compressor system in order to increase the flow activity of refrigerant medium in heat pump system in low temperature environment.

In order to achieve the object of the disclosure, the following technical scheme is adopted:

A heat pump dryer with a dual-exhaust compressor system, comprising a circulating air path consisting of a drying drum and a drying air path for circularly flowing of a drying air flow; and a heat pump system consisting of an evaporator, a throttling device, a condenser and a compressor successively connected end to end for circularly flowing of a refrigerant medium; wherein the condenser and the evaporator are disposed in the drying air path, and perform heat exchange with the drying air flow; the compressor is provided with at least two independent suction compression chambers, and the suction compression chambers are switchably connected in series state or in parallel state via a control device.

Further, the compressor is provided with two suction compression chambers, which are respectively a first suction compression chamber and a second suction compression chamber; the first suction compression chamber is provided with a first suction port and a first exhaust port, the second suction compression chamber is provided with a second suction port and a second exhaust port; the first suction port/the first exhaust port and the second exhaust port/the second suction port are respectively communicated with the control device.

Further, the control device is composed of a two-position four-way valve; four joints of the two-position four-way valve are respectively communicated with a liquid inlet and a liquid outlet of the compressor, the first suction port/the first exhaust and the second exhaust port/the second suction port.

Further, the first exhaust port/the first suction port is communicated with the liquid outlet/the liquid inlet of the compressor; the second suction port/the second exhaust port is communicated with the liquid inlet/the liquid outlet of the compressor.

Further, the two-position four-way valve has two communication states; a first state: the first suction port/the first exhaust port is communicated with the second exhaust port/the second suction port, thus the first suction compression chamber and the second suction compression chamber connected in series state; a second state: the first suction port/the first exhaust port is communicated with the liquid inlet/the liquid outlet of the compressor, the second exhaust port/the second suction port is communicated with the liquid outlet/the liquid inlet of the compressor.

Further, the compressor comprises a motor, the motor drives a gas compression structure in each suction compression chamber to compress the gas in the chamber.

Further, each suction compression chamber is respectively provided with a suction port for gas inlet and an exhaust port for high pressure compressed gas flow.

Further, suction compression chambers are arranged coaxially in the upper and lower order, an output end of the motor is connected with a rotary shaft, the rotary shaft in turn passes through the suction compression chambers; the rotary shaft is connected with a rotor in each suction compression chamber in linkage mode to form an eccentric wheel structure, the rotor is driven to rotate around an axis of a rotation axis, the gas in the chamber are compressed, generating high pressure gas.

Further, an outer wall of the rotor is in contact with an inner wall of the suction compression chamber; the suction compression chamber is provided with a sliding vane which rotates with the rotor and move along a radial direction of the suction compression chamber; the sliding vane and the rotor together separate the suction compression chamber into two relatively independent portions which are a first portion and a second portion.

Further, the sliding vane is disposed radially along the suction compression chamber, preferably, the sliding vane is disposed through a side wall of the suction compression chamber. A penetrating end of the sliding vane is connected with the outer wall of the rotor, and the sliding vane generates a telescopic displacement in the axial direction according to the rotation of the rotor, so that the sliding vane cooperates with the rotor to separate the suction compression chamber into two separate parts of which the volume changes constantly with the rotor rotating, namely a first part and a second part.

Further, the compressor can be a device for compressing a gas to produce a high-pressure gas using any existing working principle, such as, piston compressors, screw compressors, centrifugal compressors and so on, in order to achieve the goal of gas compression and get high pressure gas in the suction compression chambers which are driven by the same electric motor.

The another object of the present disclosure is to provide a control method of a heat pump dryers as described above, wherein: when the dryer starts operating in a low temperature environment, all suction compression chambers of the compressor work in the parallel state.

Further, the low temperature is that the temperature of the refrigerant medium in the heat pump system is lower than the set value t1 and/or the temperature of the gas in the circulating air path is lower than the set value t2 when the dryer starts.

Further, after the temperature of the refrigerant medium in the heat pump system reaches the set value t1 and/or the temperature of the gas in the circulating air path reaches the set value t2, the compressor of the dryer is controlled to operate according to the operating state which corresponds to the selected program by the user.

Further, the drying process comprises at least a rapid drying and a normal drying; when the selected program is fast drying, the suction compression chamber of the compressor always works in parallel state.

When the selected program is normal drying, the suction compression chambers of the compressor operate in series state after the temperature of the refrigerant medium in the heat pump system reaches the set value t1 and/or the temperature of the gas in the circulating air path reaches the set value t2, so that the dryer dries clothes at low energy consumption.

Further, if the load weight m in the dryer exceeds the set value m1, and after the temperature of the refrigerant medium in the heat pump system reaches the set value t1 and/or the temperature of the gas in the circulating air path reaches the set value t2, the suction compression chamber of the compressor is controlled to operate in series state.

Further, the specific working steps of the compressor are as follows:

The volume of the first portion communicated with the suction port becomes larger and larger as the rotor rotates so that the gas continuously flows into the first portion from the suction port and the intake air quantity is continuously increased; and the volume of the second portion communicated with the exhaust port is becoming smaller and smaller, so that the gas is continuously compressed and gas pressure increases.

When the gas pressure value of the second part which is communicated with the exhaust port reaches the set value, the control valve piece at the exhaust outlet is elastically deformed under the pressure difference on both sides, and the high-pressure gas flows out of the suction compression chamber from the exhaust port.

After the foregoing technical solution is adopted, the present disclosure has the following beneficial effects compared with the prior art: when the dryer or washer-dryer starts in a low-temperature environment, the air displacement of the compressor is increased to improve the flowing activity of the refrigerant medium in the heat pump system, so as to avoid occurrence of frosting of the evaporator; at the same time, due to the liquidity enhancement of the drying refrigerant in the initial stage of drying, the environmental temperature is rising rapidly, the drying time of the dryer can be shortened. More particularly, by the two suction compression chambers connected in parallel state or in series state, the compressor is divided into two working states. When need for rapid drying clothes, the use of the suction compression chambers in parallel state improves the air displacement of the refrigerant medium, so that makes the temperature of the gas in the circulating air path higher to shorten the drying time; in the normal working state of the drying clothes, the suction compression chamber works in series state, in order to reduce the circulating air temperature, reduce heat loss, reduce the power consumption of the drying process to achieve energy saving and environmental protection purpose. At the same time, the disclosure has simple structure, remarkable effect and is suitable for popularization.

Description of major components: 1—suction compression chamber, 2—two-position four-way valve, 3—liquid inlet, 4—liquid outlet; 11—first suction compression chamber, 12—second suction compression chamber, 111—first suction port, 112—first exhaust port, 121—second suction port, 122—second exhaust port; 21—first control valve, 22—second control valve, 23—third control valve; 10—drying drum, 20—drying air path, 30—evaporator, 40—compressor, 50—condenser, 60—throttling device, 70—fan, 101—suction chamber, 102—compression chamber, 41—shell, 42—rotor, 43—rotary shaft, 44—suction port, 45—exhaust port, 46—exhaust valve piece, 47—spring, 48—sliding vane.

DETAILED DESCRIPTION OF THE INVENTION

Specific embodiments of the present disclosure are further described below in detail with reference to the accompanying drawings.

Figure 1:
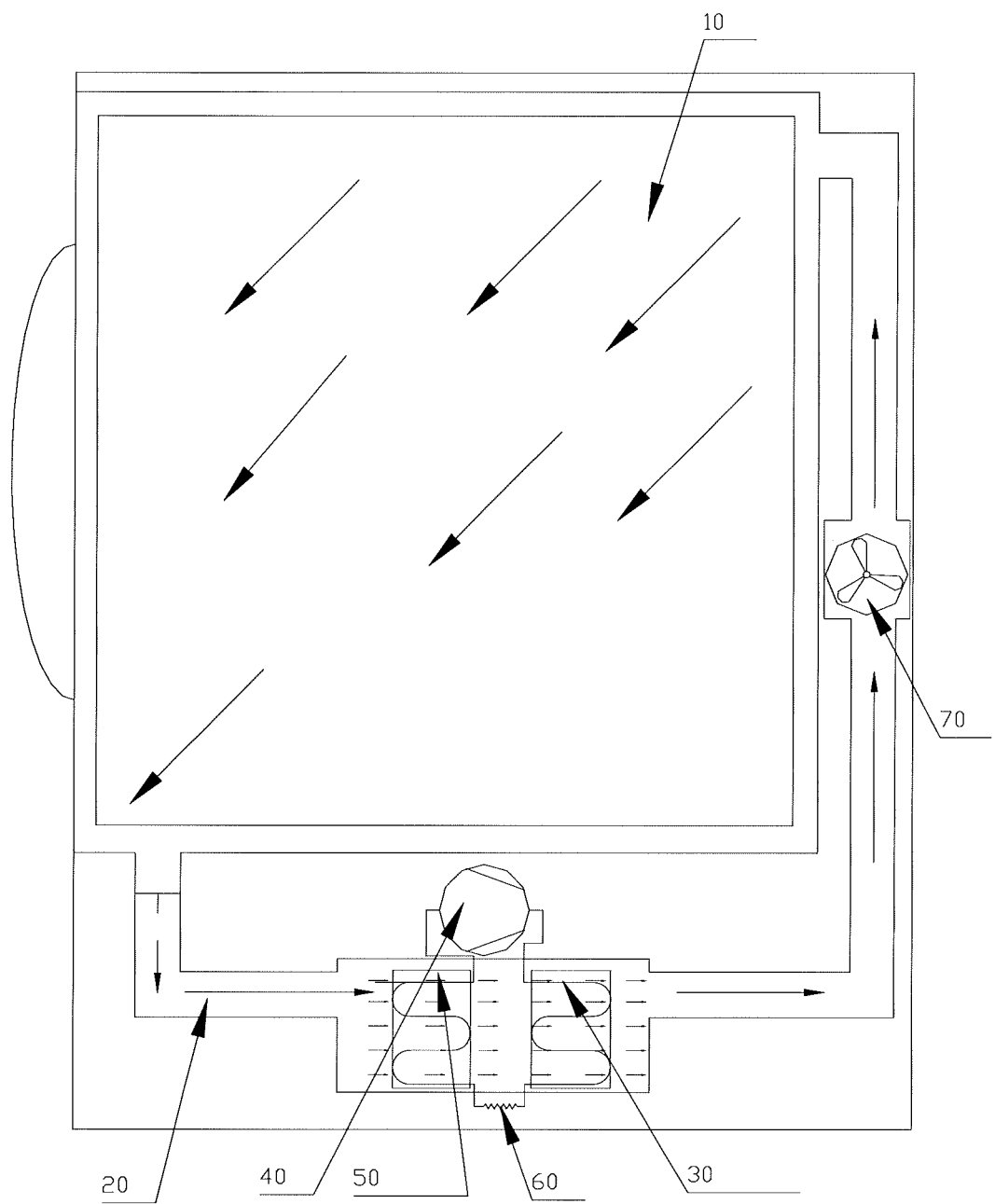
FIG. 1 is a schematic diagram of the heat pump dryer of the disclosure.

As shown in FIG. 1, in the present embodiment, a dryer or a washer-dryer comprises: a dryer shell, an outer cylinder arranged inside the shell, and an inner cylinder provided in the outer cylinder for clothes placement. The inner cylinder is provided with a plurality of dewatering holes communicating with the outer cylinder. The inner cylinder and outer cylinder together constitute a drying drum 10 for washing/drying clothes. The dryer shell is provided with a drying air path 20, one end of the drying air path 20 is an outlet which is communicated with the lower part of the drying drum 10, and the other end is an inlet which is communicated with the upper part of the drying drum 10. The drying air path 20 is provided with a fan 70. The dryer forms the circulating airflow from the bottom part of the drying drum 10 to the drying air path 20, then to the upper part of the drying drum 10, finally to the drying drum 10 through the action of the fan 70.

The dryer is further provided with a heat pump system, a part of the heat pump system is arranged in an inside of the drying air path 20, another part of which is arranged in an outside of the drying air path 20. The two parts are connected through a pipe line to form a refrigerant medium flow circulating channel.

The heat pump system comprises at least, a condenser 50, a throttling device 60, an evaporator 30, and a compressor 40 successively connected end to end through pipeline. The condenser 50 and the evaporator 30 are arranged inside the drying air part, and the condenser 50 is arranged relatively near the inlet of the drying air path 20 comparing to evaporator 30; the compressor 40 and the throttling device 60 are arranged in the outside of the drying air path 20. The outlet end of the compressor 40 is one end through which the refrigerant medium flows out of the compressor, and the outlet end is connected with the condenser 50 through a pipeline passing through the side wall of the drying air path 20. The inlet end of the compressor 40 is another end of the compressor through which the refrigerant medium flows in the compressor, and the inlet end is connected with the evaporator 30 through a pipeline passing through the side wall of the drying air path 20. Thus, under the action of the compressor, the refrigerant medium in the heat pump system circulates in the direction from the outlet end of the compressor to the condenser, from the condenser to the throttling device, from the throttling device to the evaporator, then to the inlet end of the compressor, in order to first condensate the airflow though the heat pump system and drain the condensate water, then heat up the airflow again, to achieve the purpose of drying the clothes in the dryer drum.

Embodiment 1

Figure 2:
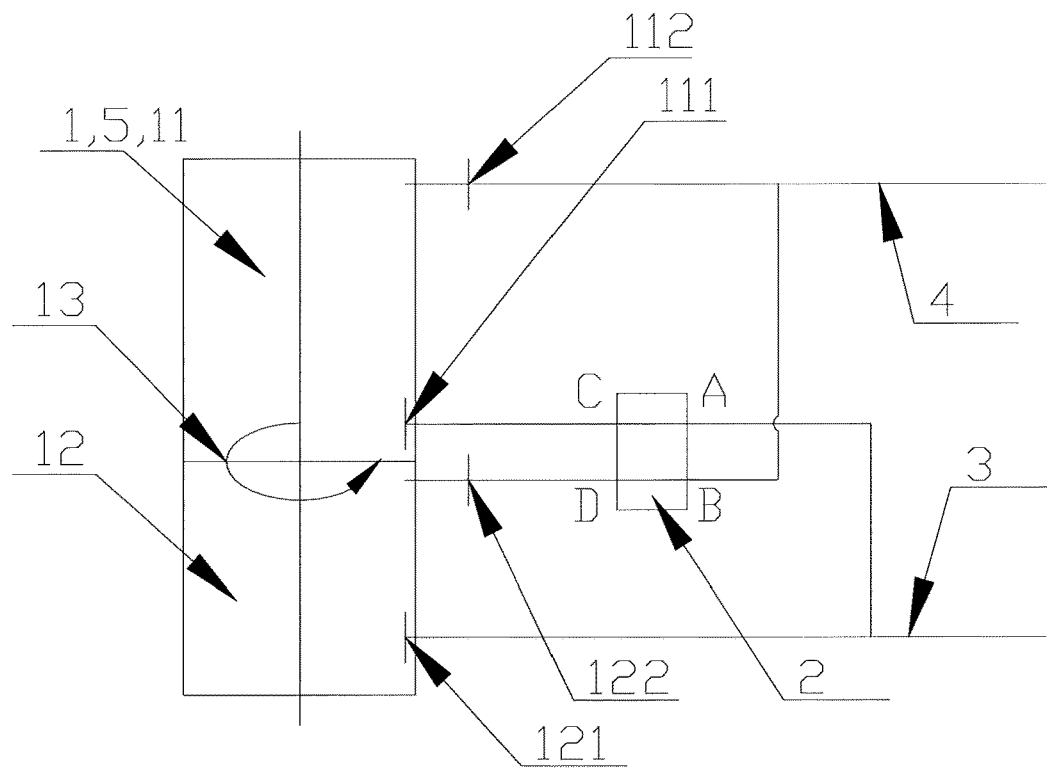
FIG. 2 is a schematic diagram of the compressor in parallel state of the disclosure.
Figure 3:
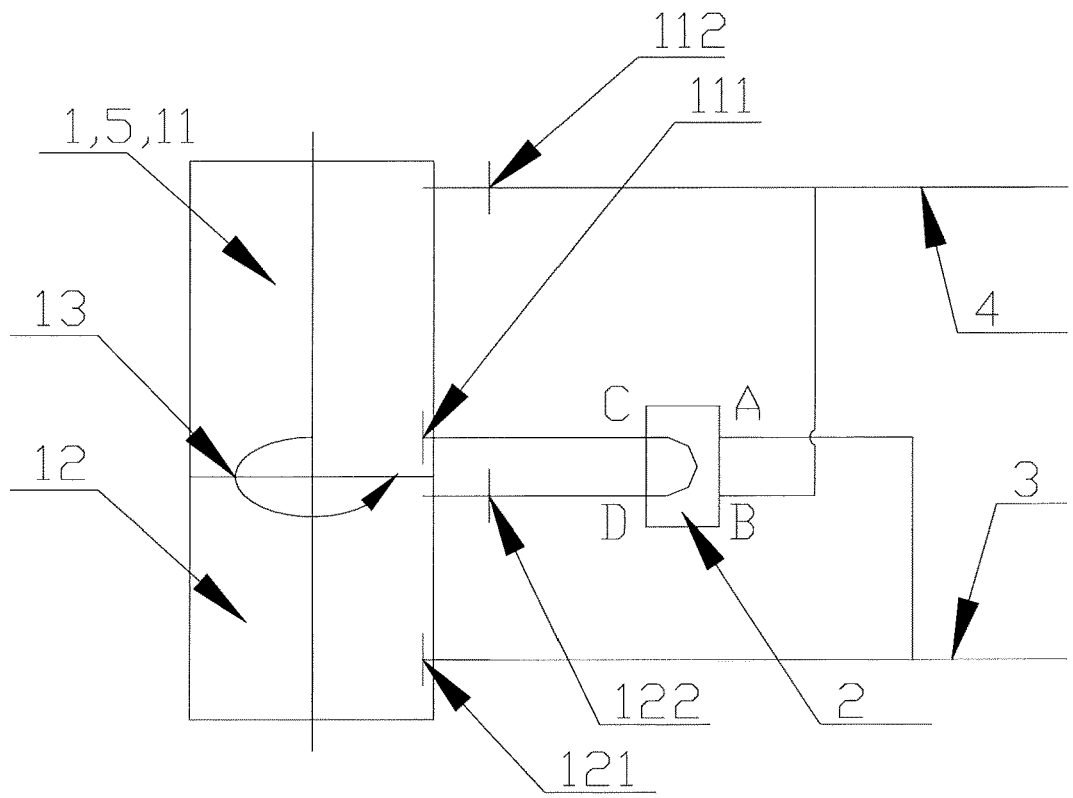
FIG. 3 is a schematic diagram of the compressor in series state of the disclosure.

As shown in FIG. 2 and FIG. 3, in the present embodiment, the compressor is provided with two suction compression chambers 1, namely a first suction compression chamber 11 in the upper portion and a second suction compression chamber 12 in the lower portion in the upper to lower positions, respectively. The first suction compression chamber 11 is provided with a first suction port 111 and a first exhaust port 112, the second suction compression chamber 12 is provided with a second suction 121 and a second exhaust port 122; the first suction port 111 and the second exhaust port 122 are respectively communicated with a control device.

The control device is composed of a two-position four-way valve 2; the four joints of the two-position four-way valve respectively are joint A communicated with a liquid inlet 3, joint B communicated with a liquid outlet 4, joint C communicated with the first suction port 111 and joint D communicated with the second exhaust port 122. The first exhaust port 112 is communicated with the liquid outlet 3 of the compressor through other pipeline; the second suction port 121 is communicated with the liquid inlet 3 of the compressor through other pipeline. In the present embodiment, the liquid inlet 4 of the compressor is connected with the evaporator 30 through pipeline, the liquid outlet 3 of the compressor is connected with the condenser 50 through pipeline.

The two-position four-way valve 2 has two communication states.

The first state as shown in FIG. 3, the joint C of the two-position four-way valve is communicated with the joint D so that the first suction port 111 is communicated with the second exhaust port 122 to connect the first suction compression chamber 11 with the second suction compression chamber 12 in series state.

The second state as shown in FIG. 2, the joint A of the two-position four-way valve is communicated with the joint C so that the second exhaust port 122 is communicated with the liquid outlet 4 of the compressor; the joint B of the two-position four-way valve is communicated with the joint D so that the first suction port 111 is communicated with the liquid inlet 3, thus the first suction compression chamber 11 is connected with the second suction compression chamber 12 in parallel state.

A two-position four-way valve is provided between the two suction compression chambers so that the connection between the first suction compression chamber and the second suction compression chamber can be converted in series or parallel state to achieve the function of adjusting the displacement of the compressor, and achieve the goal of change heat transfer efficiency of the heat pump system.

Embodiment 2

The different between the present embodiment and embodiment 1 is, the first exhaust port 112 and the second suction port 121 are respectively communicated with the control device, the second exhaust port 122 is communicated with the liquid outlet 4 of the compressor through other pipeline; the first suction port 111 is communicated with the liquid inlet 3 of the compressor through other pipeline (Not illustrated in the drawings).

The control device is composed of the two-position four-way valve 2; the four joints of the two-position four-way valve 2 are respectively communicated with the liquid inlet 3 and a liquid outlet 4 of the compressor, the first exhaust port 112 and the second suction port 121. The second exhaust port 122 is communicated with the liquid outlet 4 of the compressor; the first suction port 111 is communicated with the liquid inlet 3 of the compressor (Not illustrated in the drawings).

The two-position four-way valve 2 has two communication states.

The first state: the first exhaust port 112 is communicated with the second suction port 121 to connect the first suction compression chamber 11 and the second suction compression chamber 12 in series state.

The second state: the second suction port 121 is communicated with the liquid inlet 3 of the compressor, and the first exhaust port 112 is communicated with the liquid outlet 4 of the compressor, so that the first suction compression chamber 11 is connected with the second suction compression chamber 12 in parallel state.

Embodiment 3

The different between the present embodiment and embodiment 1 is: as shown in

Figure 4:
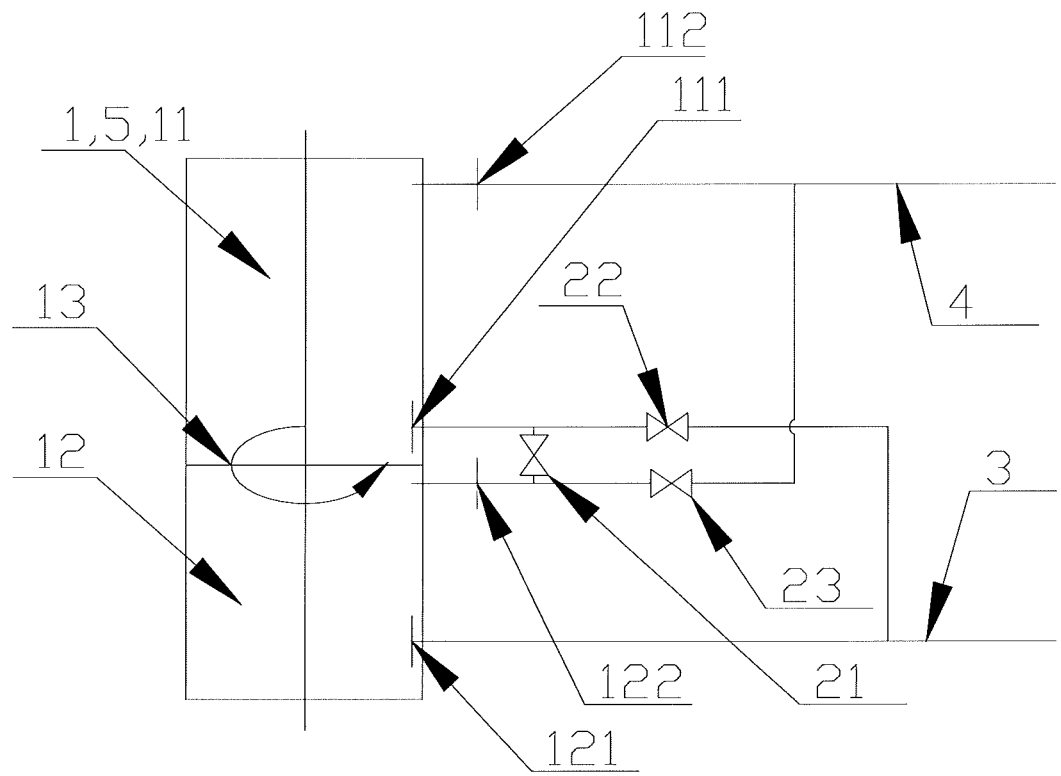
FIG. 4 is a schematic diagram of the compressor in another embodiment of the disclosure.

FIG. 4, the first suction port 111 is communicated with the second exhaust port 122 through a pipeline provided with a first control valve 21, the second exhaust port 122 is communicated with the liquid outlet 4 through a pipeline provided with a third control valve 23, the first suction port 111 is communicated with the liquid inlet 3 through a pipeline provided with a second control valve 22.

Each of the control valves comprises two on-off states:

The first state: the first control valve 21 is on, the second control valve 22 and the third control valve 23 are off, so that the first exhaust port 112 is communicated with the second suction port 121 to connect the first suction compression chamber 11 and the second suction compression chamber 12 in series state.

The second state: the first control valve 21 is off, the second control valve 22 and the third control valve 23 are on, so that the first exhaust port 112 is communicated with the liquid outlet 4 of the compressor, and the second suction port 121 is communicated with the liquid inlet 3 of the compressor to connect the first suction compression chamber 11 and the second suction compression chamber 12 in parallel state.

Embodiment 4

A method of controlling a heat pump dryer or a washer-dryer as described in any one of the embodiments 1 to 4 is described in the present disclosure, wherein: when the dryer starts drying at low temperatures, the suction compression chambers work in parallel state.

Figure 6:
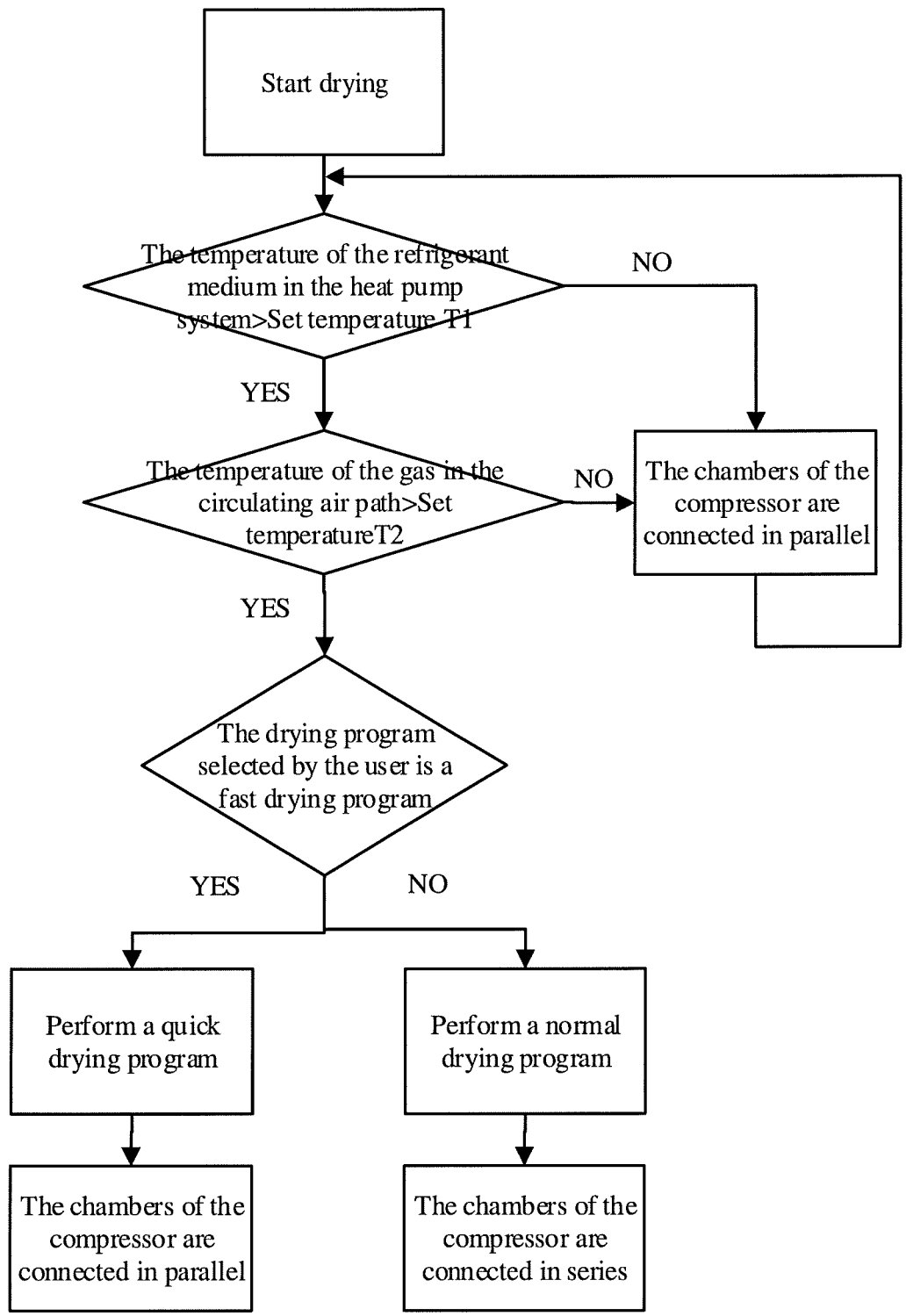
FIG. 6 is a flow chart of the drying process of the dryer of the present disclosure.

In the present embodiment as shown in FIG. 6, the specific drying process of the dryer or the washer-dryer is as follows:

1) Entering the drying process, determining whether the temperature of the refrigerant medium in the heat pump system reaches the set value t1; if yes, running step 2), if no, running step 3)

2) Determining whether the temperature of the gas in the circulation air path reaches the set value t2; if yes, running step 4), if no, running step 3).

3) The two chambers of the compressor being communicated in parallel state, and the heat pump system starting to dry the clothes for a certain period of time, and the process returns to run the step 1).

4) When the temperature of the refrigerant medium in the heat pump system reaches the set value t1 and the gas temperature in the circulating air path reaches the set value t2, determining whether the drying program selected by the user is a fast drying program; if yes, running step 5); if no, running step 6).

5) In condition that the two chambers of the compressor are connected in parallel state, the heat pump system operating until the end of the drying process.

6) In condition that the two chambers of the compressor are connected in series state, the heat pump system operating until the end of the drying process.

By the method in the present embodiment, when the dryer or the washer-dryer starts in a low-temperature environment, the air displacement of the compressor is increased to improve the flowing activity of the refrigerant medium in the heat pump system, so as to avoid occurrence of frosting of the evaporator; more particularly, by the two suction compression chambers connected in parallel state or in series state, the compressor is divided into two working states. When need for rapid drying clothes, the use of suction compression chamber in parallel state improves the displacement of the refrigerant medium, so that makes the temperature of the gas in the circulating air path higher to shorten the drying time; in the normal working state of the drying clothes, the suction compression chamber works in series state, in order to reduce the circulating air temperature, reduce heat loss, reduce the power consumption of the drying process to achieve energy saving and environmental protection purpose.

In the present embodiment, preferably, before the dryer or washer-dryer work, a load weight m is obtained by weighing. If the load weight m does not exceed the set value m1, then according to the above step 1) to 6) drying; if the load weight m exceeds the set value m1, then step 6) is executed directly after step 4), and the suction compression chambers of the compressor are controlled to operate in series state.

Embodiment 5

The present embodiment introduces a compressor disposed in the heat pump dryer or washer-dryer described in from embodiment 1 to 4. The compressor is provided with at least two independent suction compression chambers 1, the air suction compression chambers 1 are switchably connected in series or in parallel state via a control device.

In the present embodiment as shown in from FIG. 2 to FIG. 4, the compressor is a rotor compressor, the suction compression chambers 1 of the compressor is arranged coaxially in the upper and lower order; the rotary shaft 43 in turn passes through the suction compression chambers 1. The rotary shaft 43 and the rotor in each suction compression chamber are respectively connected by a linkage mode to drive the gas in the suction compression chamber to rotate at the same time to generate a high-pressure gas. Each suction compression chamber 1 is respectively provided with a suction port 44 and an exhaust port 45, and the exhaust port 45 is provided with an elastically deformable exhaust valve piece 46 for controlling the opening and closing of the exhaust port.

In the present embodiment as shown in from FIG. 5a to FIG. 5d, the compressor comprises a motor; the output end of the motor is connected to the rotary shaft 43, which is driven to rotate about an axis; the rotary shaft is provided along the axis of each suction compression chamber 1, and each compression chambers 1 of the compressors are respectively provided with the rotor 42. The rotor 42 is a columnar structure which is arranged vertically and of which the axis is different from the rotary shaft 43; the rotor 42 is fixedly connected to the rotary shaft 43 so that the rotary shaft 43 and the rotor 42 form an eccentric wheel structure. The outer wall of the rotor 42 is in frictional contact with the inner wall of the suction compression chamber 1. The suction compression chamber 1 is provided with the suction port 44 and the exhaust port 45 at a distance from each other. The exhaust port 45 is provided with the elastically deformable exhaust valve piece 46 for controlling the opening and closing of the exhaust port. A sliding vane 48 is provided between the suction port 44 and the exhaust port 45. The slide vane 48 is arranged in the radial direction of the suction compression chamber 1, and one end passes through the suction compression chamber 1 and is connected with the compressor shell 41 via a spring 47, and the other end passes through the suction compression chamber 1 and is in contact with the outer wall of the rotor 42. Therefore, the rotor 42 and the sliding vane 48 together separates the suction compression chamber into two relatively independent parts, namely the first part and the second part.

In the present embodiment, the rotor 42 is driven to rotate about the axis of the rotary shaft 43 by the rotary shaft 43; the suction port 44, the sliding vane 48 and the exhaust port 45 are sequentially arranged in the rotational direction of the rotor 42. In the present embodiment, the suction port 44 and the exhaust port 45 are provided on the side wall of the suction compression chamber 1. It is also possible that the suction port and the exhaust port are provided on the top wall or the bottom wall of the suction compression chamber (Not illustrated in the drawings).

Figure 5A:
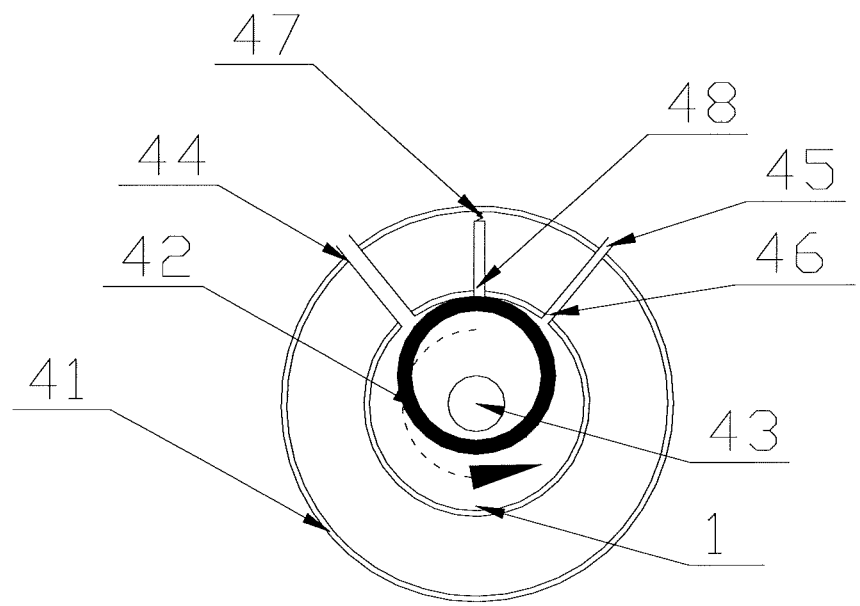
FIGS. 5a to 5d are cross-sectional structure diagrams of the compressor in different working processes of the disclosure.
Figures 5B, 5C:
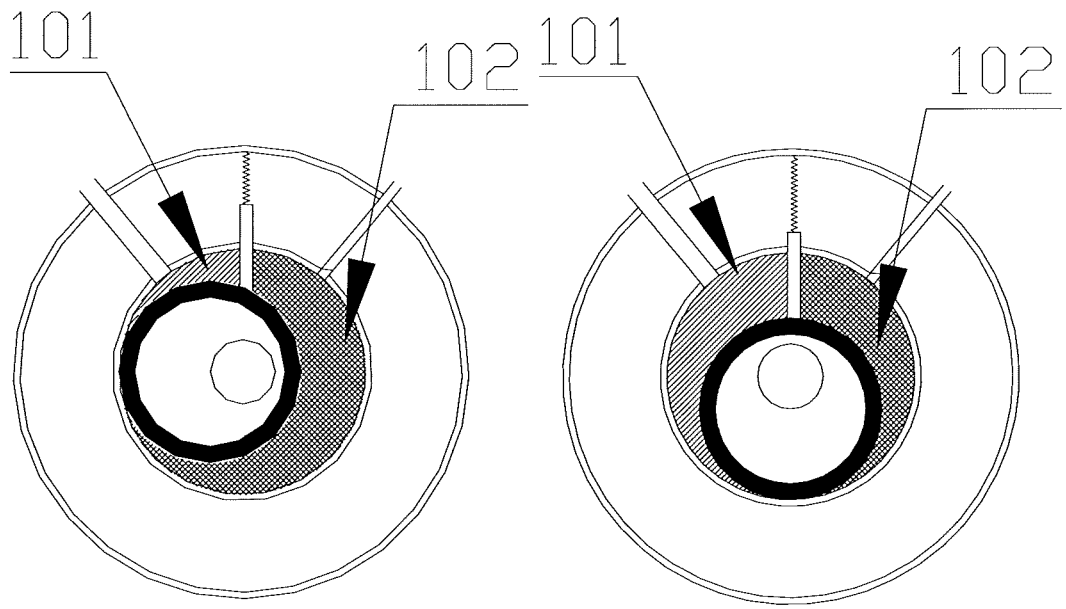
Figure 5D:
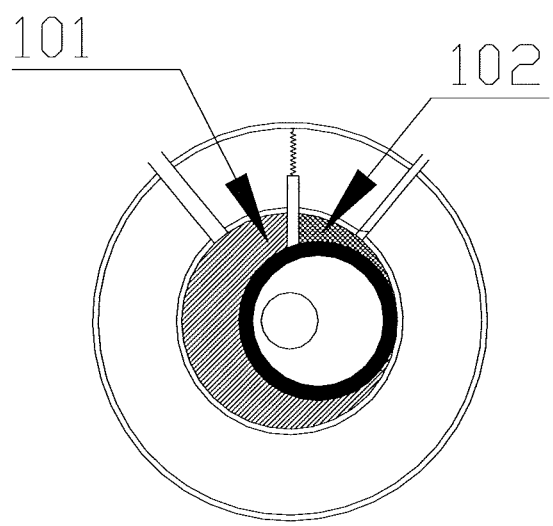

The specific working principle of the compressor is as follows:

As shown in from FIG. 5b to FIG. 5c, when the rotor 42 is rotated through the suction port 44 position, the first portion of the suction air discharge chamber 1 is communicated with the suction port 44 to form a suction chamber 101; the second portion is communicated with the exhaust port 45 to form a compression chamber 102. As the rotor 42 rotates, the volume of the suction chamber 101 increases, the total amount of intake air increases, and the gas pressure value does not change; the volume of the compression chamber 102 is continuously reduced and the total amount of the gas is not changed, resulting in an increase in the gas pressure in the compression chamber 102. When the gas pressure in the compression chamber 102 reaches the set value, the exhaust valve piece 46 at the exhaust port is elastically deformed by the differential pressure across the two sides such that the high pressure gas in the compression chamber 102 is discharged from the exhaust port 45 out of the suction compression chamber 1.

As the rotor rotates, the process is repeated so that the compressor is capable of continuously delivering high pressure gas.

In the present embodiment, the compressor can be a device for compressing a gas to produce a high-pressure gas using any existing working principle, such as, piston compressors, screw compressors, centrifugal compressors and so on, in order to achieve the goal of gas compression and get high pressure gas in each suction compression chamber which driven by the same electric motor.

The implementation solutions in the above embodiments can be further combined or replaced, and the embodiments merely describe preferred embodiments of the present disclosure, instead of limiting the concept and the scope of the present disclosure; without departing from the design concept of the present disclosure, various variations and improvements made to the technical solutions of the present disclosure by persons skilled in the art all belong to the protection scope of the present disclosure.

The invention claimed is:

1. A heat pump dryer with a dual-exhaust compressor system comprising,
a circulating air path including a drying drum and a drying air path for circularly flowing a drying air flow,
a heat pump system including an evaporator, a throttling device, a condenser and a compressor successively connected end to end for circularly flowing a refrigerant medium;
the condenser and the evaporator being disposed in the drying air path, and performing heat exchange with the drying air flow,
wherein the compressor is provided with two independent suction compression chambers, which are respectively a first suction compression chamber and a second suction compression chamber, the suction compression chambers being switchably connected in series state or in parallel state via a control device;
the first suction compression chamber is provided with a first suction port and a first exhaust port,
the second suction compression chamber is provided with a second suction port and a second exhaust port;
the first suction port and the second exhaust port are respectively communicated with the control device;
the control device is composed of a two-position four-way valve;
wherein four joints of the two-position four-way valve are respectively communicated with a liquid inlet and a liquid outlet of the compressor, the first suction port and the second exhaust port.

2. The heat pump dryer with a dual-exhaust compressor system according to claim 1, wherein the first exhaust port is communicated with the liquid outlet of the compressor; and the second suction port is communicated with the liquid inlet of the compressor.

3. The heat pump dryer with a dual-exhaust compressor system according to claim 1, wherein the two-position four-way valve has two communication states;
a first state, wherein the first suction port is communicated with the second exhaust port, so that the first suction compression chamber and the second suction compression chamber are connected in series state; and
a second state, wherein the first suction port is communicated with the liquid inlet of the compressor, the second exhaust port is communicated with the liquid outlet of the compressor.

4. The heat pump dryer with a dual-exhaust compressor system according to claim 1, wherein the compressor comprises:
a motor configured to drive a gas compression structure in each suction compression chamber to compress a gas in the suction compression chamber.

5. The heat pump dryer with a dual-exhaust compressor system according to claim 4, wherein the suction compression chambers are respectively provided with a suction port for gas flowing in and an exhaust port for high pressure compressed gas flowing out.

6. The heat pump dryer with a dual-exhaust compressor system according to claim 5, wherein the suction compression chambers are arranged coaxially in an upper and lower order,
an output end of the motor is connected with a rotary shaft,
the rotary shaft in turn passes through the suction compression chambers;
the rotary shaft is connected with a rotor in each suction compression chamber in linkage mode to form an eccentric wheel structure,
the rotor is configured to be driven to rotate around an axis of the rotary shaft, and the gas in each suction compression chamber is compressed to increase gas pressure.

7. The heat pump clothes dryer with a dual-exhaust compressor system according to claim 6, wherein an outer wall of the rotor is in contact with an inner wall of each suction compression chamber,
each suction compression chamber is provided with a sliding vane which rotates along with the rotor and moves in a radial direction of the respective suction compression chamber,
the sliding vane and the rotor together separate each suction compression chamber into two relatively independent portions which are a first portion and a second portion.

8. A control method of the heat pump dryer according to claim 1, wherein when a dryer starts operating in a low temperature environment, the suction compression chambers of the compressor work in parallel state.

9. The control method of the heat pump dryer according to claim 8, wherein the low temperature environment is that a temperature of a refrigerant medium in a heat pump system is lower than a set value t1 and/or a temperature of gas in the circulating air path is lower than a set value t2 when the dryer starts.

10. The control method of the heat pump clothes dryer according to claim 9, wherein after the temperature of the refrigerant medium in the heat pump system reaches the set value t1 and/or the temperature of gas in the circulating air path reaches the set value t2, the dryer controls the compressor to operate according to an operating state which corresponds to a selected program by a user.

11. The control method of the heat pump clothes dryer according to claim 10, wherein the drying process comprises at least a rapid drying and a normal drying;
when the selected program is the rapid drying, the suction compression chambers of the compressor always operates in a parallel state;
when the selected program is the normal drying, the suction compression chambers of the compressor operate in a series state after the temperature of the refrigerant medium in the heat pump system reaches the set value t1 and/or the temperature of gas in the circulating air path reaches the set value t2, so that the dryer dries clothes at low energy consumption.

12. The control method of the heat pump clothes dryer according to claim 8, wherein if a load weight in the dryer m exceeds a set value m1, and after the temperature of the refrigerant medium in the heat pump system reaches the set value t1 and/or the temperature of gas in the circulating air path reaches the set value t2, the suction compression chambers are controlled to operate in a series state.

13. The heat pump dryer with a dual-exhaust compressor system according to claim 2, wherein the two-position four-way valve has two communication states;
a first state, wherein the first suction port is communicated with the second exhaust port, so that the first suction compression chamber and the second suction compression chamber are connected in a series state;
a second state, wherein the first suction port is communicated with the liquid inlet of the compressor, the second exhaust port is communicated with the liquid outlet of the compressor.

* * * * *